United States Patent [19]
Shimizu

[11] Patent Number: 5,303,140
[45] Date of Patent: Apr. 12, 1994

[54] POWER SOURCE CIRCUIT

[75] Inventor: Keiichi Shimizu, Yokohama, Japan

[73] Assignee: Toshiba Lighting & Technology Corporation, Tokyo, Japan

[21] Appl. No.: 647,649

[22] Filed: Jan. 30, 1991

[30] Foreign Application Priority Data

Jan. 31, 1990 [JP] Japan .................. 2-21090

[51] Int. Cl.$^5$ ........................................ H02M 7/537
[52] U.S. Cl. ..................... 363/132; 363/17; 363/98; 315/190; 315/291; 315/DIG. 7
[58] Field of Search .............. 363/15, 24, 37, 65, 363/71, 72, 84, 89, 124, 125, 126, 131, 132, 133, 134, 17, 98; 315/190, 291, 205, 244, 307, DIG. 7

[56] References Cited

U.S. PATENT DOCUMENTS 4,553,070 11/1985 Sairanen et al. ......... 315/DIG. 7 X
4,564,897 1/1986 Okamoto et al. .................. 363/132

FOREIGN PATENT DOCUMENTS 2527889 12/1983 France .
61-94569 5/1986 Japan .
2-202365 8/1990 Japan .
2133940 8/1984 United Kingdom .

*Primary Examiner*—Emanuel T. Voeltz
*Attorney, Agent, or Firm*—Cushman, Darby & Cushman

[57] ABSTRACT

In a power source circuit, an AC voltage of a commercial AC power source is full-wave-rectified by a diode bridge and divided into two ½ voltages by two capacitors connected to the output terminals of the diode bridge. A half-bridge inverter operation is performed by a smoothing capacitor and first and second reverse-conductive switches connected in parallel with the output terminals of the diode bridge via inductors, respectively. A power from the capacitors is temporarily stored in the inductors, and the first and second reverse-conductive switches are operated, thereby performing two boosting chopper operations.

4 Claims, 5 Drawing Sheets

POWER SOURCE CIRCUIT

BACKGROUND OF THE INVENTION

1. Field of the Invention

The present invention relates to a power source circuit, and more particularly, to a power source circuit for converting a low-frequency alternating current into a high-frequency alternating current via a direct current and outputting the converted current.

2. Description of the Related Art

Recently, regulations for a high frequency with respect to an input current of a power source circuit, such as an inverter for illumination to be connected to a commercial AC power source, have become more strict year after year. For this reason, a circuit must realize not only a high efficiency, as in a conventional circuit, but also a low-distortion input. In a known conventional arrangement, a chopper circuit is provided at an input to control an input current, thereby realizing such a low-distortion input.

When a chopper circuit is provided at an input, however, a two-stage conversion of the chopper circuit and an invertor is arranged in a power source circuit to increase the number of constituting parts. Therefore, an inexpensive power source circuit cannot be obtained.

For this reason, arrangements disclosed in Unexamined Published Japanese Patent Application No. 61-94569 and No. 2-202365 are known. For example, in the circuit disclosed in Patent 61-94569, as shown in FIG. 1 (PRIOR ART), a rectifier 14 is connected to the output terminal of a commercial AC power source 12. One terminal of a reactor 16 is connected to one output terminal of the rectifier 14, and a smoothing electrolytic capacitor 18 is connected to the other terminal of the reactor 16. A series circuit constituted by reverse-conductive switches 20 and 22 and a series circuit constituted by two capacitors 24 and 26 are connected in parallel with the two terminals of the electrolytic capacitor 18. A node between the switches 20 and 22 is connected to the other terminal of the rectifier 14. A load 28 is connected between a node between the switches 20 and 22 and a node between the capacitors 24 and 26.

In the power source circuit having the above arrangement, the reverse-conductive switches 20 and 22 are alternately switched on/off at a high frequency. As a result, the circuit operates as an inverter, and the switch 20 operates as a chopper to charge the smoothing capacitor 18.

In the above conventional circuit, however, since boosting is performed by the chopper operation, a DC voltage must be designed to be at least two time more than a peak voltage of an AC voltage. If an AC voltage is 100 V, a corresponding DC voltage is about 300 V, and no problem is posed in selection of a switching element. If an AC voltage is 200 V, however, a corresponding DC voltage is 600 V, and it is difficult to select a switching element.

In addition, since an input current is intermittently supplied by the chopper operation, a filter circuit is required to perform smoothing. For this reason, a large capacitance and a large inductance are required.

Furthermore, since the reverse-conductive switch 20 singly performs switching of all the capacitance, the switch 20 must have a large rated current. For these reasons, manufacturing cost of the circuit is increased.

SUMMARY OF THE INVENTION

It is, therefore, an object of the present invention to provide a power source circuit capable of withstanding a decreased voltage against a ripple component of an input current, thereby reducing manufacturing cost.

According to an aspect of the present invention, there is provided a power source circuit comprising: AC power source means; a full-wave rectifier, connected to the AC power source means, for performing full-wave rectification; a series circuit connected to an output terminal of the full-wave rectifier and constituted by connecting a smoothing capacitor, first and second inductors, and first and second diodes, the diodes having polarities in forward directions with respect to an output from the full-wave rectifier; first and second reverse-conductive switching means connected in parallel with the smoothing capacitor, the first and second reverse-conductive switching means being connected in series with each other; and at least two capacitors, provided in association with the first and second inductors, respectively, for forming a circuit for supplying stored energies of the inductors to the smoothing circuit in accordance with an alternate ON/OFF operation of the first and second reverse-conductive switching means.

According to another aspect of the present invention, there is provided a power source circuit comprising: AC power source means; a full-wave rectifier, connected to the AC power source means, for performing full-wave rectification; a series circuit connected to an output terminal of the full-wave rectifier and constituted by connecting a smoothing capacitor and first and second diodes, the diodes having polarities in forward directions with respect to an output from the full-wave rectifier; first and second reverse-conductive switching means connected in parallel with the smoothing capacitor, the first and second reverse-conductive switching means being connected in series with each other; an inductor connected between at least one output terminal of the full-wave rectifier and a node between the first and second series-connected reverse-conductive switching means; and at least two capacitors, provided in association with the inductor, for forming a circuit for supplying a stored energy of the inductor to the smoothing capacitor in accordance with an alternate ON/OFF operation of the first and second reverse-conductive switching means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will be described below with reference to the accompanying drawings.

Figure 1:
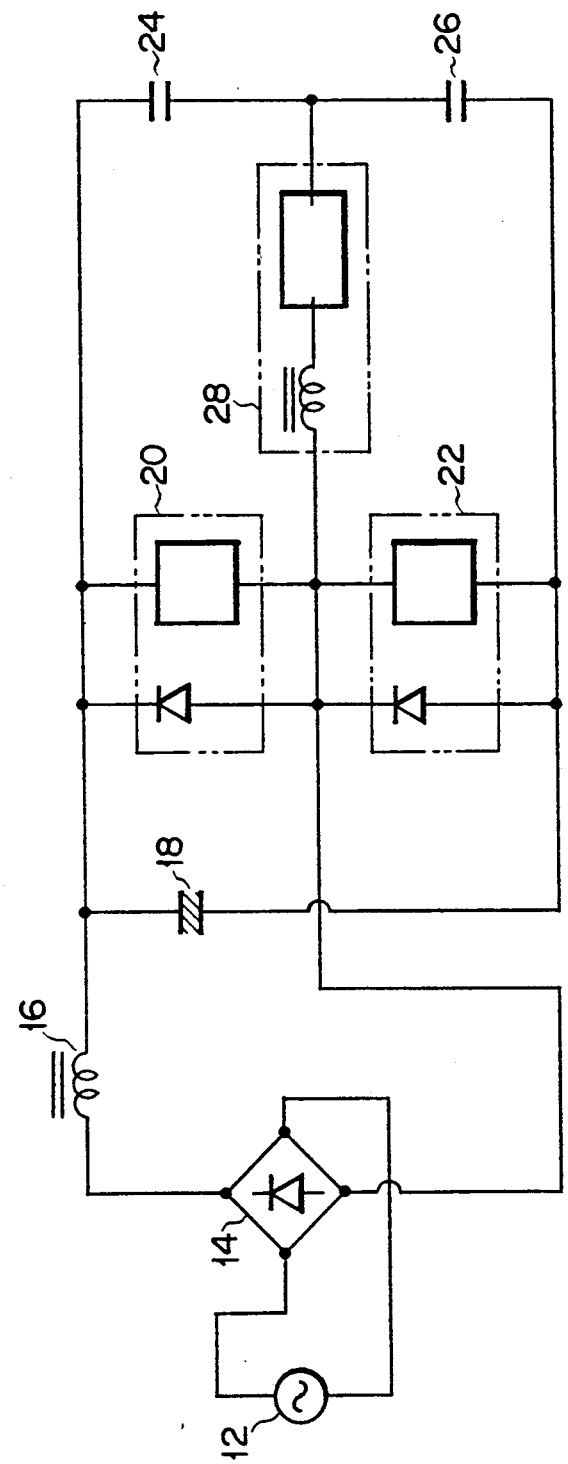
FIG. 1 (PRIOR ART) is a circuit diagram showing an arrangement of a power source circuit.
Figure 2:
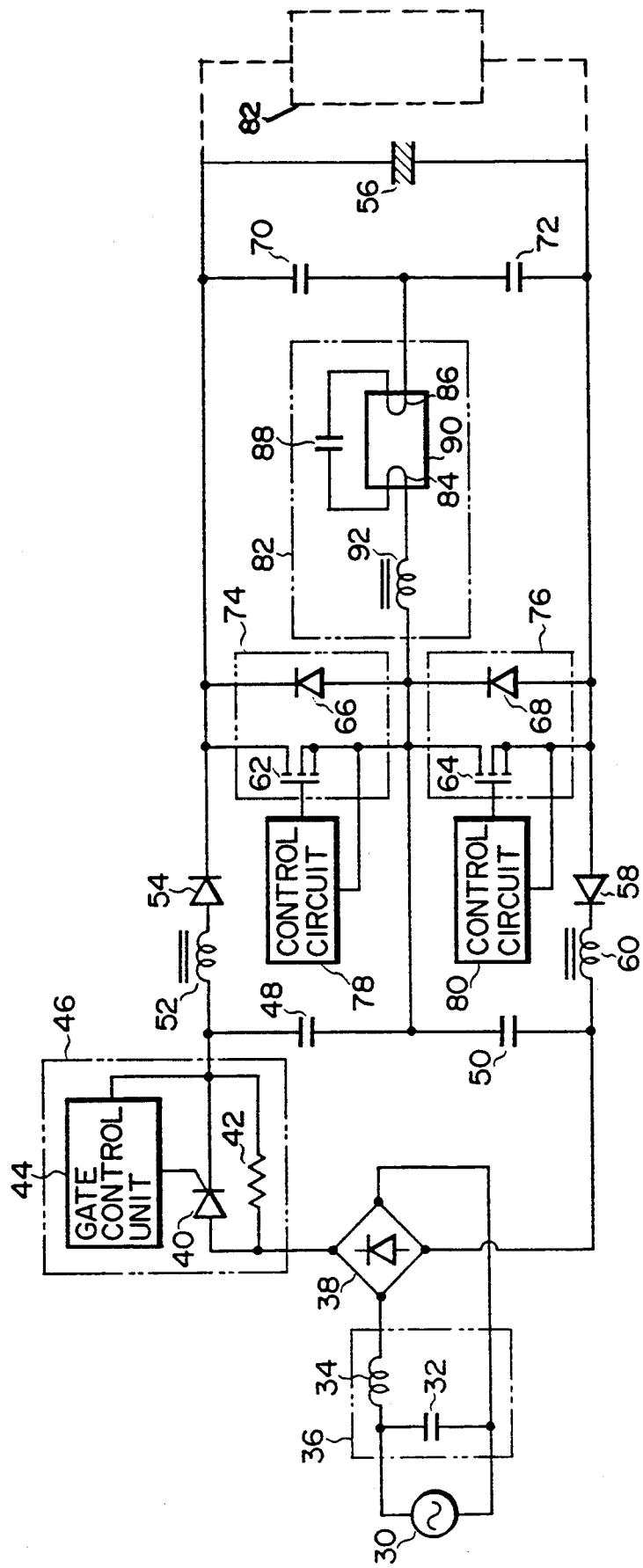
FIG. 2 is a circuit diagram showing an arrangement of the first embodiment of a power source circuit according to the present invention.

FIG. 2 is a circuit diagram showing a power source circuit according to the first embodiment of the present invention. Referring to FIG. 2, the two terminals of a commercial AC power source 30 are connected to an input filter 36 constituting a capacitor 32 and an inductor 34, and to the input terminal of a diode bridge 38 as a full-wave rectifier via the input filter 36. One of the two output terminals of the diode bridge 38 is connected to an inrush current preventing circuit 46 having a thyristor 40, a resistor 42 connected in parallel with the thyristor 40, and a gate control unit 44. The two output terminals of the diode bridge 38 are connected to two series-connected capacitors 48 and 50 and a series circuit constituted by an inductor 52, a diode 54, a smoothing capacitor 56, a diode 58, and an inductor 60 via the inrush current preventing circuit 46. The polarities of the diodes 54 and 58 are connected in forward directions with respect to the outputs of the diode bridge 38, as shown in FIG. 2.

The smoothing capacitor 56 is connected in parallel with series-connected field-effect transistors 62 and 64, series-connected diodes 66 and 68, and series-connected voltage-dividing capacitors 70 and 72. The diodes 66 and 68 are connected in reverse-blocking directions with respect to the diode bridge 38. Note that a node between the field-effect transistors 62 and 64 and a node between the diodes 66 and 68 are connected to a node between the capacitors 48 and 50.

A pair, consisting of the transistor 62 and the diode 66, and a pair, consisting of the transistor 64 and the diode 68, form reverse-conductive switches 74 and 76, respectively. In addition, control circuits 78 and 80 for controlling an ON/OFF operation at a high frequency are respectively connected to the transistors 62 and 64.

A load 82 is connected between a node between the switches 74 and 76 and a node between the capacitors 70 and 72. This load 82 has, e.g., a discharge lamp 90 in which a starting capacitor 88 is connected between filaments 84 and 86, and an inductor 92 series-connected to the filament 84.

A DC voltage of the smoothing capacitor 56 is set to be higher than an AC voltage of the load 82. In addition, the values of the inductors 52 and 60 are determined to set a current discontinuous mode in which a current is temporarily reduced from the capacitance of the load to zero (a stored energy is completely discharged) during ON times of the field-effect transistors 62 and 64.

An operation of the power source circuit having the above arrangement will be described below. Referring to FIG. 2, a power from the commercial AC power source 30 is input via the input filter 36 and the diode bridge 38. As a result, the input voltage is divided into two ½ DC power sources by the capacitors 48 and 50. Note that the capacitors 48 and 50 do not perform a so-called smoothing operation for a frequency component of the power source 30. In this state, the field-effect transistors 62 and 64 are alternately turned on/off at a high frequency.

When the transistor 62 is turned on, the transistor 64 is turned off. Therefore, a charge of the capacitor 48 flows from and returns to the capacitor 48 through a path of the inductor 52, the diode 54, and the transistor 62, and the energy from the capacitor 48 is stored in the inductor 52. A charge of the capacitor 50 flows from and returns to the capacitor 50 through a path of the diode 66, the smoothing capacitor 56, the diode 58, and the inductor 60. In this case, the energy is discharged from the inductor 60 to charge the smoothing capacitor 56.

When the transistor 62 is turned off, the transistor 64 is turned on. Therefore, a charge of the capacitor 48 flows from and returns to the capacitor 48 through a path of the inductor 52, the diode 54, the smoothing capacitor 56, and the diode 68, and the energy is discharged from the inductor 52 to charge the smoothing capacitor 56. A charge of the capacitor 50 flows from and returns to the capacitor 50 through a path of the transistor 64, the diode 58, and the inductor 60. In this case, the energy from the capacitor 50 is stored in the inductor 60.

By repeating the above operation, two boosting chopper operations having a phase difference of 180° are performed.

In addition, since the field-effect transistors 62 and 64 are alternately turned on/off at a high frequency, an operation as a half-bridge inverter is performed to supply a high frequency to the load.

According to the above embodiment, a DC voltage of the smoothing capacitor 56 is set to be higher than the peak value of the AC voltage of the load 82, and the values of the inductors 52 and 60 are set in a current discontinuous mode. Therefore, since an input current at a low frequency close to an input voltage waveform is obtained, a high power factor and low distortion can be achieved.

As described above, since two ½-capacitance choppers are connected in parallel with each other with a phase difference of 180°, a ripple of an input current is canceled to be smaller than that obtained in a conventional arrangement. Therefore, an arrangement of the input filter 36 can be simplified, and a manufacturing cost can be reduced.

Furthermore, since the voltage rectified by the two capacitors 48 and 50 is divided, a low-voltage design of a DC voltage of about 300 V can be realized even if an AC voltage is 200 V. Therefore, reverse-conductive switches 74 and 76 having a small current capacity and a low voltage can be used to reduce the cost.

The second embodiment of the present invention will be described below with reference to FIG. 3. In each of the following embodiments, the same reference numerals as in the first embodiment denote the same parts, and a detailed description of an operation of the entire arrangement will be omitted because it is the same as that of the arrangement according to the first embodiment.

Figure 3:
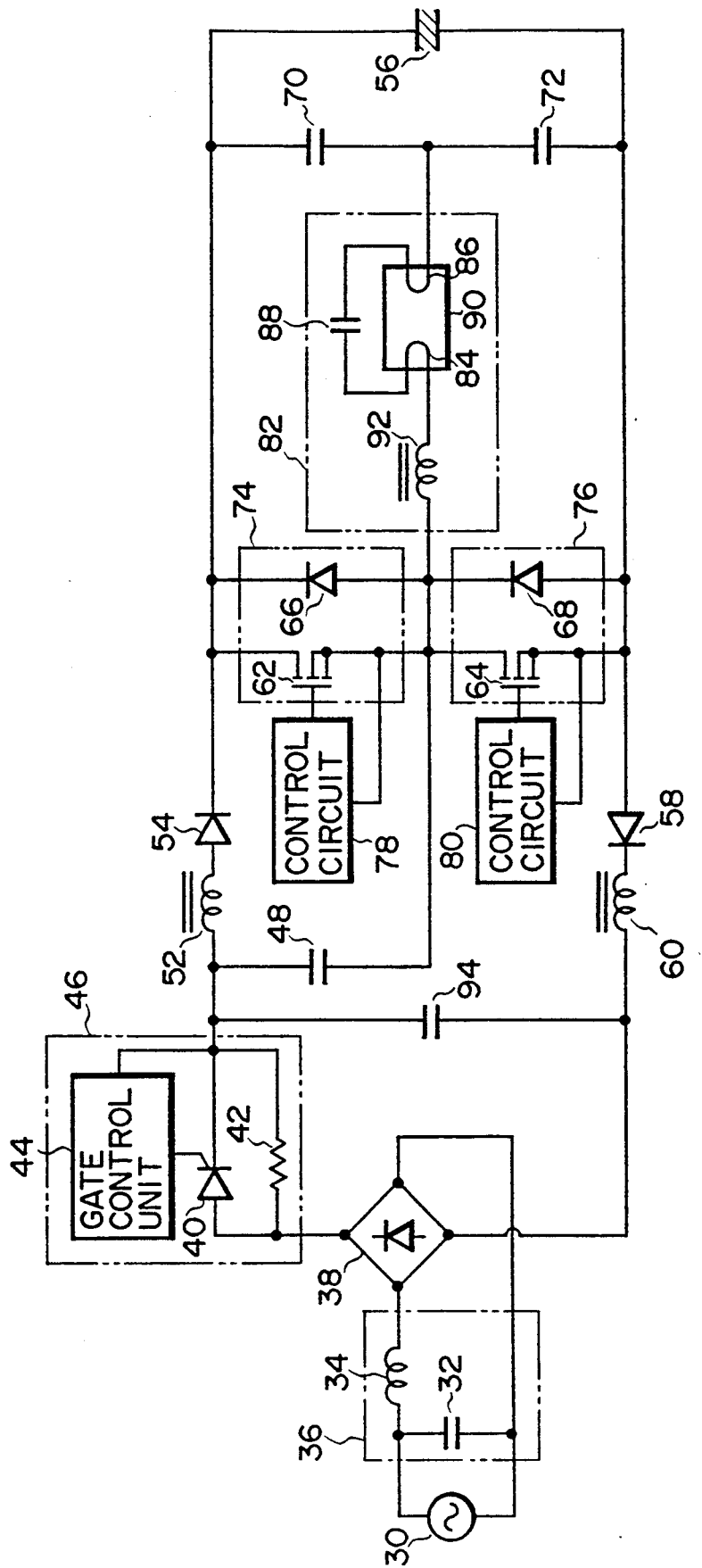
FIG. 3 is a circuit diagram showing an arrangement of the second embodiment of a power source circuit according to the present invention.

In a power source circuit shown in FIG. 3, the capacitor 50 is omitted in the circuit shown in FIG. 2, and instead, a capacitor 94 is connected between the two terminals of a diode bridge 38 via an inrush current preventing circuit 46.

In the power source circuit having the above arrangement, when a field-effect transistor 62 is turned on, a current flowing through a capacitor 48 and a diode 66 is shunted to an inductor 52 and a diode 54.

According to the second embodiment, although a high-frequency ripple is increased as compared with the first embodiment described above, the number of constituting parts can be reduced and a high power factor can be realized.

Figure 4:
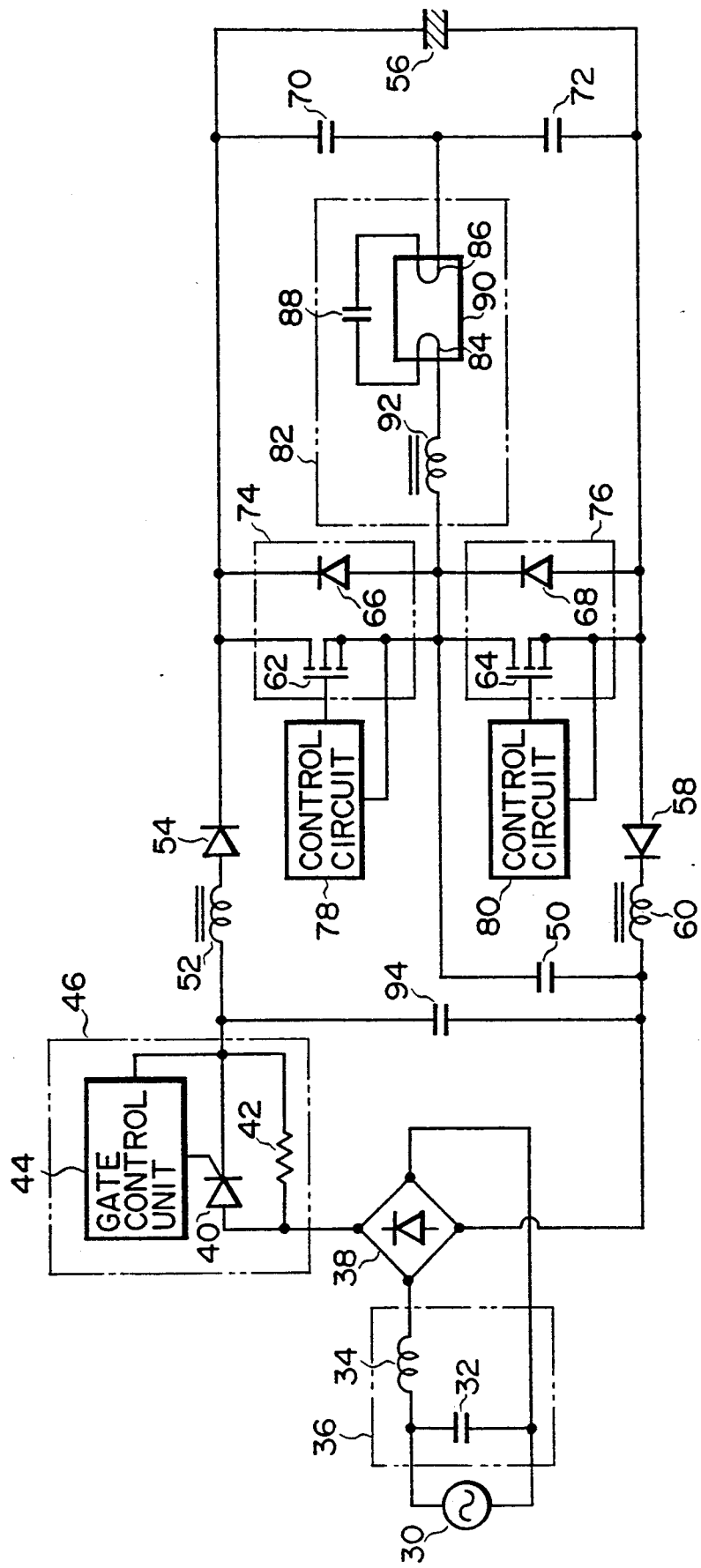
FIG. 4 is a circuit diagram showing an arrangement of the third embodiment of a power source circuit according to the present invention.

FIG. 4 is a circuit diagram showing an arrangement of the third embodiment of a power source circuit according to the present invention. In the third embodiment, as in the above second embodiment, the capacitor 48 is omitted in the circuit shown in FIG. 2, and instead, a capacitor 94 is connected between the two terminals of a diode bridge 38 via an inrush current preventing circuit 46.

Figure 5:
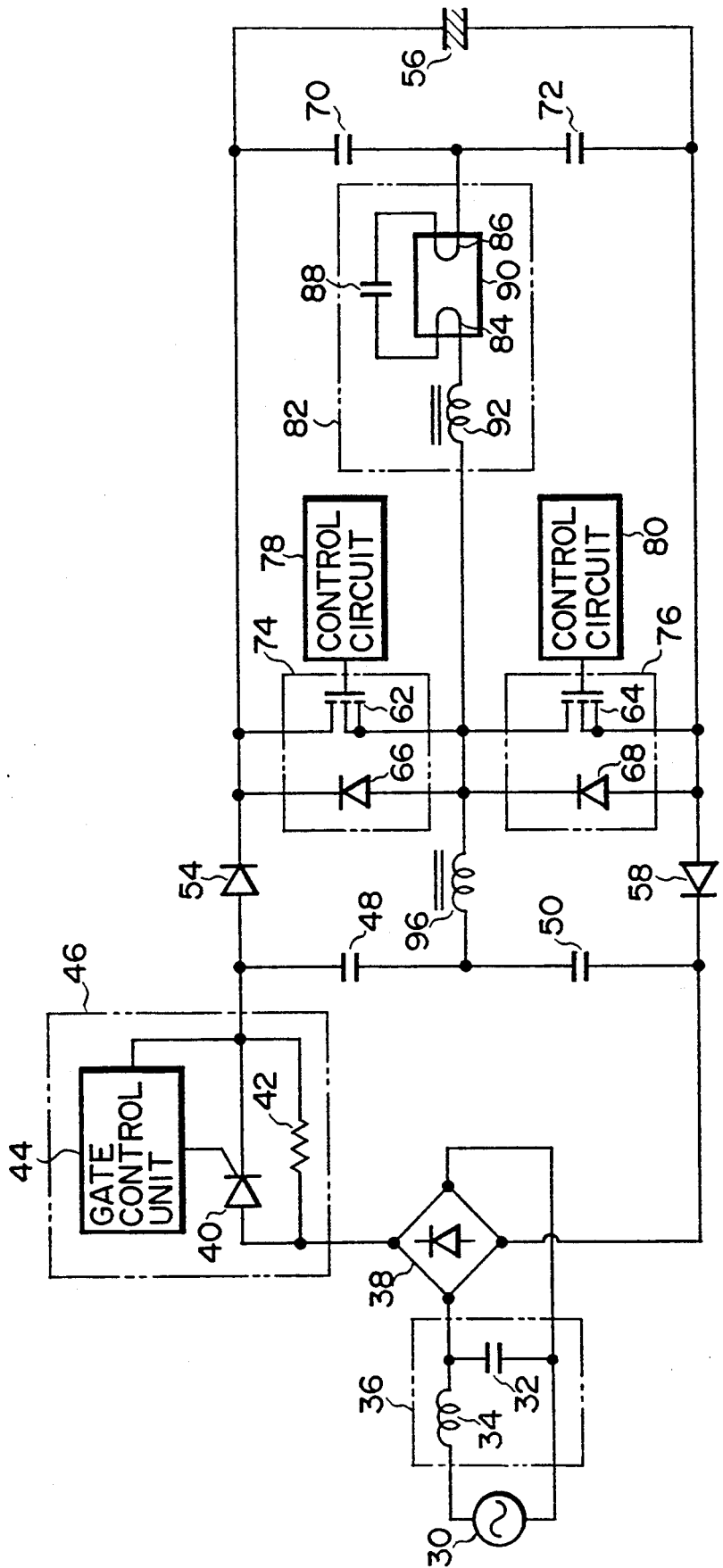
FIG. 5 is a circuit arrangement showing an arrangement of the fourth embodiment of a power source circuit according to the present invention.

FIG. 5 is a circuit diagram showing the fourth embodiment of a power source circuit according to the present invention. In the power source circuit shown in FIG. 5, the two inductors 52 and 60 ar omitted in the power source circuit shown in FIG. 2, and an inductor 96 is connected between a node between capacitors 48 and 50 and a node between reverse-conductive switches 74 and 76. In this case, a triangular-wave AC current flows through the inductor 96.

In this circuit arrangement, instead of using the capacitor 50, a capacitor may be connected between the two terminals of the diode bridge 38 via the inrush current preventing circuit 46, as shown in FIG. 3. Likewise, instead of using the capacitor 48, a capacitor may be connected between the two terminals of the diode bridge 38 via the inrush current preventing circuit 46, as shown in FIG. 4.

Note that in each of the above embodiments, the load 82 may be connected in parallel with the smoothing capacitor 56, as shown in FIG. 2.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power source circuit comprising:
   a full-wave rectifier, receiving an output voltage from an AC power source and performing full-wave rectification;
   a series circuit connected to output terminals of said full-wave rectifier comprising: a smoothing capacitor; first and second inductors; and first and second diodes, said diodes having polarities in forward directions with respect to said output terminals of said full-wave rectifier;
   first and second reverse-conductive switches connected in parallel with said smoothing capacitor, said first and second reverse-conductive switches being connected in series with each other; and
   second and third capacitors connected between said first and second inductors and said output terminals of said full-wave rectifier, forming a circuit for supplying stored energies of said inductors to said smoothing circuit in accordance with an alternate ON/OFF operation of said first and second reverse-conductive switches.

2. The circuit according to claim 1, further comprising an inrush current preventing circuit means connected to one of said output terminals of said full-wave rectifier and including a thyristor having an anode, a cathode, and a gate, a resistor connected in parallel with said thyristor between said anode and said cathode, and a gate control unit connected between said gate and said cathode of said thyristor.

3. A power source circuit comprising:
   a full-wave rectifier, receiving an output voltage from an AC power source and performing full-wave rectification;
   a series circuit connected to output terminals of said full-wave rectifier comprising: a smoothing capacitor; first and second inductors; and first and second diodes, said diodes having polarities in forward directions with respect to said output terminals of said full-wave rectifier;
   first and second reverse-conductive switches connected in parallel with said smoothing capacitor, said first and second reverse-conductive switches connected in series with each other, said first and second reverse-conductive switches comprising: first and second series-connected field-effect transistors; and third and fourth diodes, said diodes connected in parallel with said first and second field-effect transistors in reverse-blocking directions with respect to said output terminals of said full-wave rectifier;
   second and third capacitors connected between said first and second inductors and said output terminals of said full-wave rectifier, forming a circuit for supplying stored energies of said inductors to said smoothing circuit in accordance with an alternate ON/OFF operation of said first and second reverse-conductive switches; and
   first and second control circuits, controlling high-frequency ON/OFF operations of said first and second field-effect transistors, respectively.

4. A power source circuit comprising:
   a full-wave rectifier, receiving an output voltage from an AC power source and performing full-wave rectification;
   a series circuit connected to output terminals of said full-wave rectifier comprising: a smoothing capacitor; first and second inductors; and first and second diodes, said diodes having polarities in forward directions with respect to said output terminals of said full-wave rectifier;
   first and second reverse-conductive switches connected in parallel with said smoothing capacitor and connected in parallel with series-connected voltage-dividing capacitors, said voltage-dividing capacitors being between said reverse conductive switches and said smoothing capacitor, said first and second reverse-conductive switches being connected in series with each other; and
   second and third capacitors connected between said first and second inductors and said output terminals of said full-wave rectifier, forming a circuit for supplying stored energies of said inductors to said smoothing circuit in accordance with an alternate ON/OFF operation of said first and second reverse-conductive switches; and
   wherein a DC voltage of said smoothing capacitor is set to be higher than an AC voltage of a load connected between a node between said first and second reverse-conductive switches and a node between said voltage-dividing capacitors, values of said first and second inductors being determined to set a current discontinuous mode in which a stored energy is completely discharged from a load capacitance of said load during ON times of said first and second reverse-conductive switches.

* * * * *